United States Patent [19]
Grover

[11] Patent Number: 5,911,409
[45] Date of Patent: Jun. 15, 1999

[54] BARGE RATCHET DRIVER WITH REACTION BARS

[75] Inventor: Donald D. Grover, Kenosha, Wis.

[73] Assignee: Snap-on Tools Company, Kenosha, Wis.

[21] Appl. No.: 08/980,719

[22] Filed: Dec. 1, 1997

[51] Int. Cl.⁶ ..................................................... B25B 25/00
[52] U.S. Cl. ........................... 254/235; 254/236; 254/234
[58] Field of Search .................................... 254/229, 230, 254/231, 234, 235, 236

[56] References Cited

U.S. PATENT DOCUMENTS

| | | |
|---|---|---|
| 310,767 | 1/1885 | Wilson . |
| 398,286 | 2/1889 | Speer ....................................... 254/231 |
| 468,344 | 2/1892 | Hopkins . |
| 649,045 | 5/1900 | Elliott . |
| 957,823 | 5/1910 | Viles . |
| 1,037,615 | 9/1912 | Grenier . |
| 1,147,318 | 7/1915 | Fulford ..................................... 254/234 |
| 1,191,063 | 7/1916 | Cochran . |
| 1,505,549 | 8/1924 | Faerch ................................. 254/234 X |
| 1,714,447 | 5/1929 | Rockwell . |
| 2,053,522 | 9/1936 | Gourley et al. . |
| 2,220,288 | 11/1940 | Sarosdy . |
| 2,845,288 | 7/1958 | Cierpik, Jr. . |
| 3,065,007 | 11/1962 | Colmer, Jr. . |
| 3,338,359 | 8/1967 | Baillie et al. . |
| 4,078,514 | 3/1978 | Patterson, III et al. . |
| 4,155,278 | 5/1979 | Estok . |
| 4,462,282 | 7/1984 | Biek . |
| 4,830,339 | 5/1989 | McGee et al. . |
| 5,425,350 | 6/1995 | Egusquiza . |
| 5,611,521 | 3/1997 | Grover et al. . |

FOREIGN PATENT DOCUMENTS

| | | | |
|---|---|---|---|
| 29986 | 8/1904 | Switzerland | ............................ 254/234 |
| 25258 | of 1912 | United Kingdom | .................... 254/231 |

*Primary Examiner*—Donald P. Walsh
*Assistant Examiner*—Emmanuel M. Marcelo
*Attorney, Agent, or Firm*—Emrich & Dithmar

[57] ABSTRACT

A power drive assembly is provided for an elongated turn buckle-type cable tightener having an elongated sleeve with a driven gear wheel on it, and two loop-defining cable and anchors respectively threadedly engaged in its opposite ends. A drive unit is adapted to be coupled to the sleeve and has a motor-driven gear engageable with the driven gear for rotating the sleeve. Two right-angle reaction bars couple the frame of the drive unit to the cable anchors each reaction bar having one end slidably received in openings in the drive unit frame and another and received through the loop of the associated cable anchor.

22 Claims, 2 Drawing Sheets

BARGE RATCHET DRIVER WITH REACTION BARS

BACKGROUND OF THE INVENTION

1. Field of the Invention

This invention relates to cable tighteners and, more particularly, to motor-driven powered drives for such tighteners.

2. Description of the Prior Art

Turnbuckle assemblies are conventionally used for tightening load binding cables in various fields and also in the marine industry for tightening cables lashing barges to each other and to marine tugboats. Manual cable tighteners used in the marine industry have a ratchet mechanism for turning the turnbuckle sleeve, but require considerable manual effort and time in order to operate them to properly tighten marine lashing cables. Accordingly, motor-powered drive units for such cable tighteners have been provided, one such drive unit being disclosed in U.S. Pat. No. 5,611,521, of which the present invention is an improvement.

The drive unit of U.S. Pat. No. 5,611,521 has a housing which is adapted to be coupled to the sleeve of the cable tightener turnbuckle, and has a motor-driven drive gear which is adapted to mesh with the driven gear of the turnbuckle sleeve for rotating it. The unit has two hand grips to assist an operator in connecting the unit to the cable tightener. When the unit is in operation, it must be supported on the deck of the barge, or other support surface adjacent to and parallel to the cable. The rotation of the turnbuckle sleeve by the drive gear creates a reaction force which tends to rotate the drive unit in the opposite direction. This reaction force is transmitted through the unit to the deck of the barge or like support surface on which the unit is supported. This need for an adjacent support limits the orientations in which the unit can effectively be used. Thus, it cannot effectively be used when the cable tightener is elevated above the deck or inclined at an angle to the deck, such as when the cables extend between different heights or levels on joined vessels.

Furthermore the drive unit of U.S. Pat. No. 5,611,521, as well as other powered drive units, can frequently result in twisting of the cables during rotation of the cable tightener. Thus, when turnbuckle sleeve is rotated, instead of the anchors being screwed into the ends of the sleeve, they may tend to rotate with the sleeve, especially if the engaged threads have rusted, resulting in twisting and winding of the attached cables. Reaction pins through the eyes or loops of the cable tightener anchors have been used to alleviate this problem, but that technique is ineffective where the cable tightener is disposed above the deck.

SUMMARY OF THE INVENTION

It is a general object of the present invention to provide a drive assembly for a cable tightener which avoids the disadvantages of prior drive assemblies while affording additional structural and operating advantages.

An important feature of the invention is the provision of a drive assembly of the type set forth which is usable in any orientation.

A further feature of the invention is the provision of a drive assembly of the type set forth which prevents twisting or winding of a cable being tightened.

In connection with the foregoing features a further feature of the invention is the provision of a drive assembly of the type for use with a cable tightener having a central torque input member and anchor structures respectively oppositely threadedly engaged in opposite ends of the torque input member, wherein the reaction load generated by rotation of the torque input member is transferred directly to the anchor structures.

Another feature of the invention is the provision of a drive assembly of the type set forth which includes reaction members coupled between the frame of the drive unit and the cable anchor structures, and being slidable relative to the drive unit frame to accommodate axial movement of the anchor structures.

A still further feature of the invention is the provision of a drive assembly of the type set forth, which is of simple and economical construction.

Certain ones of these and other features of the invention may be attained by providing a drive assembly for a cable tightener having an elongated central torque input member supporting a driven gear and two anchor structures respectively oppositely threadedly engaged in opposite ends of the torque input member, at least one of the anchor structures being engageable with an associated cable to be tightened, the assembly comprising: a drive unit having a drive gear engageable with the driven gear to rotate the driven gear and the torque input member, and reaction structure coupled to the drive unit and to the at least one of the anchor structures for preventing rotation of the at least one of the anchor structures in response to rotation of the torque input member by the drive unit.

Further features of the invention may be attained by providing in a power drive assembly for a cable tightener having an elongated central torque input member supporting a driven gear and two anchor structures respectively oppositely threadedly engaged in opposite ends of the torque input member, at least one of the anchor structures being engageable with an associated cable to be tightened, wherein the assembly includes a drive unit having inner and outer frames interconnected for relative movement between engaged and open positions with respect to the torque input member, a drive gear on one of the frames engageable with the driven gear to rotate the driven gear and the torque input member when the drive unit is in its engaged position relative to the torque input member, and a motor carried by the one frame to rotate the drive gear, the improvement comprising: a reaction structure coupled to the drive unit and to the at least one of the anchor structures for preventing rotation of the at least one of the anchor structures in response to rotation of the torque input member by the drive unit.

The invention consists of certain novel features and a combination of parts hereinafter fully described illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation and many of its advantages should be readily understood and appreciated.

DESCRIPTION OF THE PREFERRED EMBODIMENT

Figure 1:
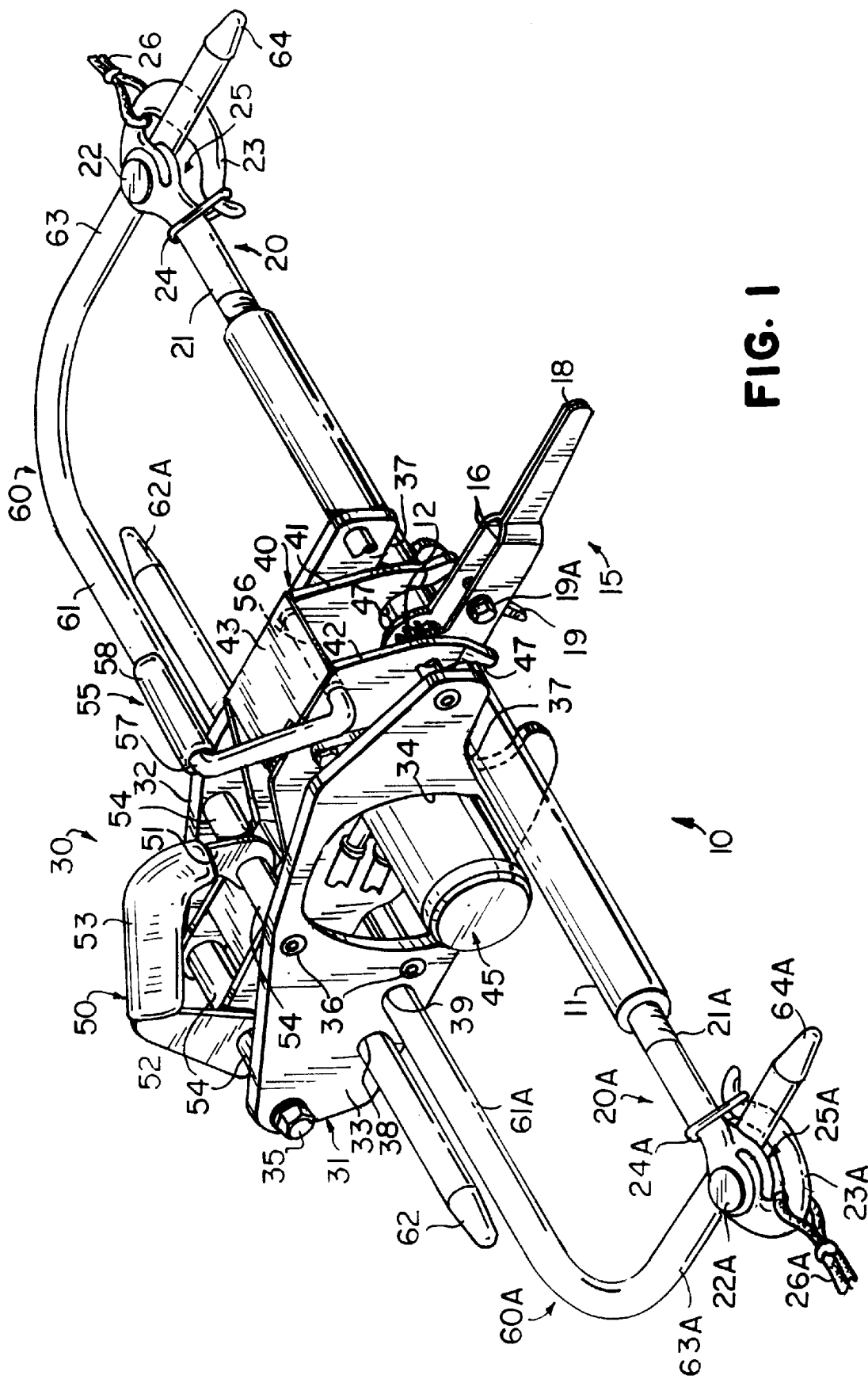
FIG. 1 is a perspective view of the drive assembly of the present invent ion coupled to an associated cable tightener, with portions broken away more clearly to show the construction.
Figure 2:
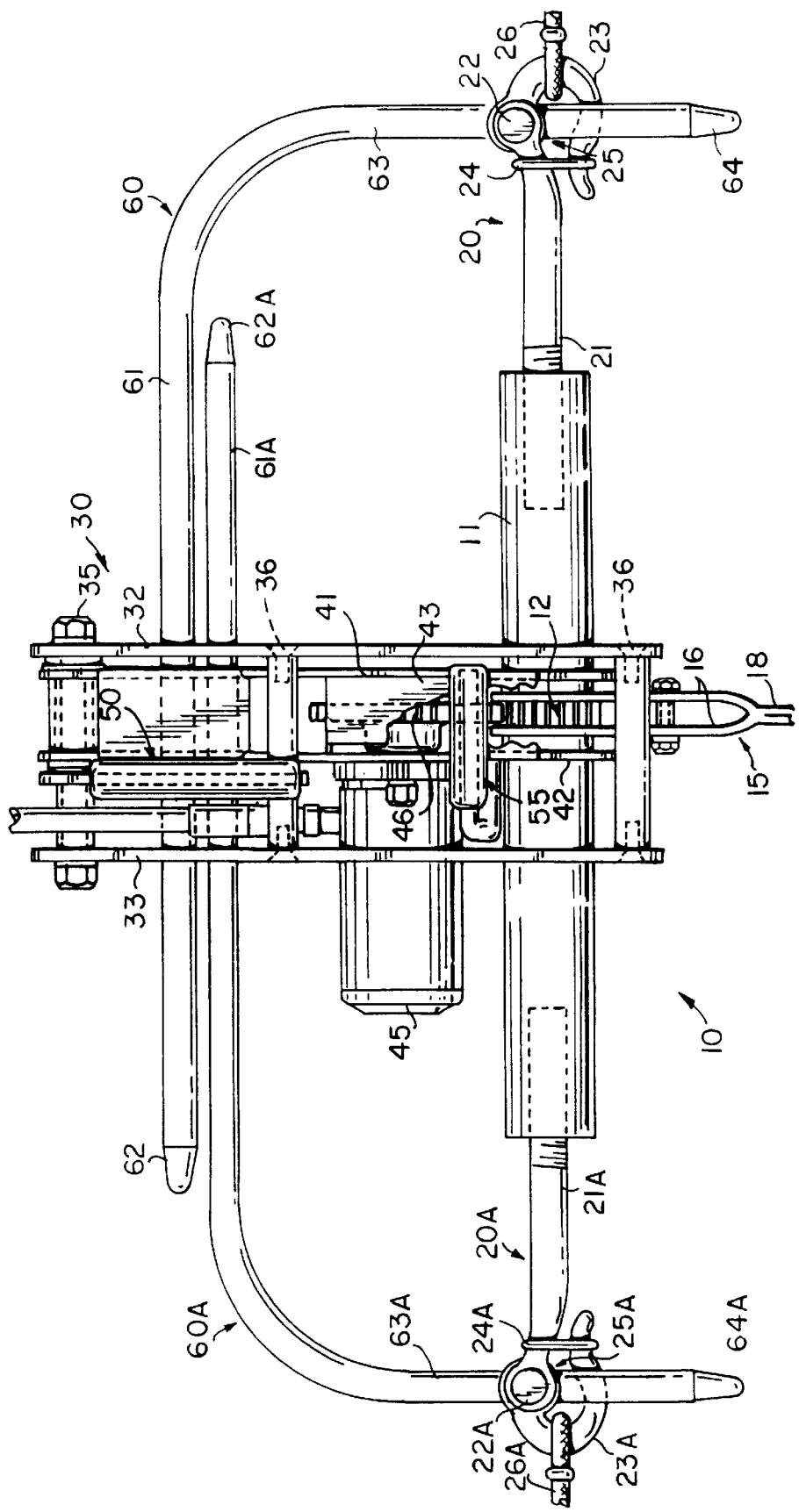
FIG. 2 is a top plan view of the drive assembly of FIG 1, again with portions broken away.

Referring to FIGS. 1 and 2, there is illustrated a cable tightener 10 of the turnbuckle type having a central torque input member in the nature of an elongated cylindrical sleeve 11, which has fixed to the outer surface thereof, coaxially therewith and intermediate the ends thereof, a driven gear 12. A lever 15 has clevis arms 16 with openings therethrough (not shown) receiving the sleeve 11, with the arms 16 disposed on opposite sides of the gear 12. The clevis arms 16 are joined to form a handle end 18 of the lever 15. A ratchet dog 19 freely pivots from a bolt 19a extending between the clevis arms 16 and depends therefrom for engagement with the teeth of the driven gear 12 for ratchet-type manual rotation of the sleeve 11 in a known manner.

Two anchor structures 20 and 20A, formed as mirror images of each other are, respectively, coupled to the opposite ends of the sleeve 11. The anchor structures 20, 20A, respectively, have elongated threaded ends 21, 21A oppositely threadedly engaged in the associated ends of the sleeve 11, and having their distal ends pivotally coupled by pivot joints 22, 22A to hook ends, 23, 23A to form what are commonly known as "pelican hooks." The hook ends 23, 23A are pivotal between open and closed positions relative to the threaded ends 21, 21A, being retained in the closed positions by retainers 24, 24A to define loops 25, 25A. Cable ends 26, 26A may be coupled to the hooks 23, 23A, as by having loops in the cable ends slipped over the free ends of the hooks, all in a known manner. While the anchor structures 20A, 20 are disclosed as pelican hooks, it will be appreciated that they could have other loop-defining forms, such as eye-bolts.

There is also provided a drive unit, generally designated by the numeral 30, for motor-powered rotation of the sleeve 11. The drive unit 30 is substantially like that disclosed in the aforementioned U.S. Pat. No. 5,611,521, the disclosure of which is incorporated herein by reference. The drive unit 30 has an outer frame 31 including a pair of parallel side plates 32 and 33, the latter having an enlarged aperture 34 therethrough. The plates 32 and 33 are secured together by a rear bolt 35 and a plurality of forward bolts 36, each encircled by suitable spacers to maintain the separation between the plates. The forward ends of the plates are provided with forward-opening notches 37 to fit around the sleeve 11. Each of the plates 32 and 33 has two circular openings 38, 39 formed therethrough adjacent to the lower edge thereof (not shown in plate 32) for a purpose to be explained more fully below. The openings 38, 39 in one plate are respectively substantially coaxial with the openings 38, 39 in the other plate.

The drive unit 30 also includes an inner frame 40, which also includes a pair of parallel side plates 41 and 42, the upper edges of which are interconnected by a shield plate 43. Fixed to the side plate 42 is a motor 45, preferably a hydraulic motor, which projects outwardly through the aperture 34 in the outer frame side plate 33. The motor 45 has an output shaft (not shown) which projects through a complementary opening in the side plate 42 and is fixed to a drive gear 46 disposed between the plates 41 and 42 (see FIG. 2). The rear ends of the side plates 41 and 42 are apertured to receive therethrough the rear bolt 35 and its associated spacer, this inner spacer being surrounded with outer spacers to space the plates 41 and 42 of the inner frame 40. The forward ends of the side plates 41 and 42 are provided with downwardly-opening notches 47 dimensioned to fit over the sleeve 11.

The inner frame 40 is pivotally movable about the axis of the rear bolt 35 between an open condition (not show) to allow insertion of the sleeve 11 into the notches 37 of the outer frame 31, and a closed or engaged condition illustrated in the drawings, dropped down over the sleeve 11 for cooperation with the outer frame 31 to retain the drive unit 30 in a drive configuration coupled to the sleeve 11. In this drive configuration, the drive gear 46 is disposed in meshing engagement with the driven gear 12 of the cable tightener 10.

In order to facilitate manipulation of the drive unit 30, it is provided with an outer frame handle 50 having legs 51 and 52, respectively coupled to the rear bolt 35 and the adjacent one of the bolts 36, and being positioned by suitable spacers, the legs 51 and 52 being joined by a hand-engaging portion covered with a sleeve 53. Similarly, the unit is provided with an inner frame handle 55 which is also generally U-shaped, having an end 56 which is receivable through complementary openings in the upper edges of the inner side plates 41 and 42 and secured in place, as by welding. The handle 55 has a hand-engaging upper handle end 57 covered with a sleeve 58. The hand-engaging portions of the handles 50 and 55 preferably extend in opposite directions and facilitate lifting of the drive unit 30 and pivoting of the inner frame 40 relative to the outer frame 31.

It is a significant aspect of the invention that the drive unit 30 includes reaction structure in the form of a pair of reaction bars 60, 60A each in the form of a right-angle bar. The bar 60 includes a long drive leg 61 slidably receivable through the aligned holes 38 in the outer frame side plates 32 and 33 and an anchor leg 63 receivable through the loop 25 of the anchor structure 20, the legs 61 and 63 respectively having tapered tips 62 and 64 to facilitate insertion. Similarly, the reaction bar 60A has a drive leg 61A with tapered tips 62A for slidable reception to the aligned holes 39 in the inner frame side plates 32 and 33, and a shorter anchor leg 63A with a tapered tip 64A receivable through the loop 25A of the anchor structure 20A.

In operation, the drive unit 30 is mounted on the cable tightener 10 in the drive configuration illustrated in the drawings, in which position it is fully supported on the cable tightener 10. Thus, the drive unit 30 cooperates with the reaction bars 60, 60A to form a drive assembly which can be used in any orientation of the cable tightener 10. Because all of the reaction force to the drive unit 30 is transmitted by the reaction 60, 60A to the anchor structures 20, 20A of the cable tightener 10, there is no need for an adjacent support surface, such as the deck of the barge, to support the drive unit 30 and take up the reaction force. Furthermore, it will be appreciated that the reaction bars 60, 60A prevent the anchor structures 20, 20A from rotating with the sleeve 11, thereby preventing twisting or winding of the associated cables 26, 26A. Accordingly, the sleeve 11 is forced to rotate relative to the anchor structures 20, 20A, forcing the latter to be threaded axially into the sleeve 11 to tighten the cables.

It is a significant aspect of the invention, that the sliding support of the reaction legs 61, 61A of the reaction bars 60, 60A in the outer frame 31 of the drive unit 30 accommodates axial movement of the reaction bars 60, 60A, to follow the axial movement of the anchor structures 20, 20A.

While the present invention has been disclosed as applied to tightening of cables in barge applications it will be appreciated that the principles of the present invention have wider application and could be used in any environment where one or more cable ends needs to be tightened. Thus, the invention could be used for cables securing loads to pallets or vehicles, or for tightening guy cables of utility poles, towers and the like.

From the foregoing, it can be seen that there has been provided an improved drive assembly which is motor powered and can be fully supported on an associated cable tightener, while effectively preventing winding or twisting of cables being tightened.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A drive assembly for a cable tightener having an elongated central torque input member supporting a driven gear and two anchor structures respectively oppositely threadedly engaged with opposite ends of the torque input member, at least one of the anchor structures being engageable with an associated cable to be tightened said assembly comprising:

a drive unit including a drive frame and having a drive gear engageable with the driven gear to rotate the driven gear and the torque input member, and reaction structure removably coupled to said drive frame and to the at least one of the anchor structures for preventing rotation of the at least one of the anchor structures in response to rotation of the torque input member by said drive unit.

2. The drive assembly of claim 1, wherein said reaction structure includes a reaction member in the form of a solid metal bar.

3. The drive assembly of claim 1, wherein said reaction structure includes a reaction member in the form of an angle member.

4. The drive assembly of claim 3, wherein said angle member includes two legs cooperating to form substantially a right angle.

5. The drive assembly of claim 4, wherein said drive frame has an opening therein, one leg of said reaction member being received in said opening.

6. The drive assembly of claim 1, wherein said drive unit is a powered drive unit including a motor coupled to said drive gear.

7. The drive assembly of claim 6, and further comprising handle means coupled to said drive unit.

8. The drive assembly of claim 1, wherein said reaction structure includes two reaction members each coupled to said drive unit and respectively coupled to the anchor structures.

9. The drive assembly of claim 8, wherein said drive frame has two apertures therein, each of the anchor structures defining a loop, each of said reaction members having first and second ends with the first ends of said reaction members being respectively received in said apertures and the second ends of said reaction members being respectively received through said loops.

10. The drive assembly of claim 1, wherein the at least one of the anchor structures defines a loop.

11. The drive assembly of claim 10, wherein the at least one of the anchor structures is a pelican hook.

12. The drive assembly of claim 10, wherein the drive frame has an opening therein, said reaction structure including a reaction member having a first and receivable in said aperture and a second and receivable through said loop.

13. The drive assembly of claim 12, wherein said reaction member is in the form of a right angle member.

14. The drive assembly of claim 1, wherein said reaction structure is coupled to said drive frame for slidable movement relative thereto to accommodate axial movement of the at least one of the anchor structures.

15. In a power drive assembly for a cable tightener having an elongated central torque input member supporting a driven gear and two anchor structures respectively oppositely threadedly engaged with opposite ends of the torque input member, at least one of the anchor structures being engageable with an associated cable to be tightened, wherein the assembly includes a drive unit having inner and outer frames interconnected for relative movement between engaged and open positions with respect to the torque input member, a drive gear on one of the frames engageable with the driven gear to rotate the driven gear and the torque input member when the drive unit is in its engaged position relative to the torque input member, and a motor carried by the one frame to rotate the drive gear, the improvement comprising:

a reaction structure removably coupled to one of said inner and outer frames and to the at least one of the anchor structures for preventing rotation of the at least one of the anchor structures in response to rotation of the torque input member by the drive unit.

16. The drive assembly of claim 15, wherein the motor is a hydraulic motor.

17. The drive assembly of claim 15, wherein the motor is carried by the inner frame.

18. The drive assembly of claim 15, and further comprising two handles respectively fixed to the frames.

19. The drive assembly of claim 18, wherein one of the handles has a hand-engaging portion extending in use substantially parallel to the torque input member and the other handle has a hand-engaging portion extending in use generally perpendicular to the torque input member.

20. The drive assembly of claim 15, wherein said reaction structure is coupled to the outer frame of the drive unit.

21. The drive assembly of claim 15, wherein each of the anchor structures defines a loop, one of said inner and outer frames has two passages therethrough, and said reaction structure includes two reaction members each having first and second ends with the first ends of said reaction members being respectively received through the passages and with the second ends of said reaction members being respectively received through the loops.

22. The drive assembly of claim 15, wherein said reaction structure is coupled to the drive unit for slidable movement relative thereto to accommodate axial movement of the at least one of the anchor structures.

* * * * *